US012761315B2

(12) United States Patent
Mottier et al.

(10) Patent No.: US 12,761,315 B2
(45) Date of Patent: Oct. 13, 2026

(54) METHOD FOR DEINTERLEAVING RADAR PULSES

(71) Applicants: BULL SAS, Les Clayes-sous-Bois (FR); CENTRALESUPELEC, Gif-sur-Yvette (FR); Centre national de la recherche scientifique, Paris (FR); UNIVERSITE PARIS-SACLAY, Gif-sur-Yvette (FR)

(72) Inventors: Manon Mottier, Paris (FR); Frédéric Pascal, Ivry-sur-Seine (FR); Gilles Chardon, Palaiseau (FR)

(73) Assignees: BULL SAS, Les Clayes-sous-Bois (FR); CENTRALESUPELEC, Gif-sur-Yvette (FR); Centre national de la recherche scientifique, Paris (FR); UNIVERSITE PARIS-SACLAY, Gif-sur-Yvette (FR)

( * ) Notice: Subject to any disclaimer, the term of this patent is extended or adjusted under 35 U.S.C. 154(b) by 292 days.

(21) Appl. No.: 18/414,079

(22) Filed: Jan. 16, 2024

(65) Prior Publication Data

US 2024/0241219 A1 Jul. 18, 2024

(30) Foreign Application Priority Data

Jan. 17, 2023 (EP) .................................... 23305059

(51) Int. Cl.
*G01S 7/292* (2006.01)

(52) U.S. Cl.
CPC .................................. *G01S 7/2923* (2013.01)

(58) Field of Classification Search
CPC ............................... G01S 7/2923; G01S 7/021
See application file for complete search history.

(56) References Cited

U.S. PATENT DOCUMENTS

| | | | | |
|---|---|---|---|---|
| 8,350,749 | B1 * | 1/2013 | Malas | G01S 7/412 342/195 |
| 2019/0195983 | A1 * | 6/2019 | Chefson | G01S 7/021 |

FOREIGN PATENT DOCUMENTS

| | | | |
|---|---|---|---|
| CN | 115166678 | A | 10/2022 |

OTHER PUBLICATIONS

S. Kolouri, Y. Zou and G. K. Rohde, "Sliced Wasserstein Kernels for Probability Distributions," 2016 IEEE Conference on Computer Vision and Pattern Recognition (CVPR), Las Vegas, NV, USA, 2016, pp. 5258-5267, doi: 10.1109/CVPR.2016.568. (Year: 2016).*

(Continued)

*Primary Examiner* — Resha Desai
*Assistant Examiner* — Naomi M Wolford
(74) *Attorney, Agent, or Firm* — ARC IP Law, PC; Joseph J. Mayo

(57) ABSTRACT

A method for deinterleaving radar pulses, implemented by a computer. The method includes implementing a first clustering algorithm for assigning each pulse to a corresponding first class, based on the associated frequency, duration and time of arrival. The method also includes, for each first class, the method includes estimating a respective average frequency and average pulse duration, and implementing a second clustering algorithm to group the first classes into second classes based on the corresponding average frequency and average duration. For each second class, the method includes determining a distribution of the times of arrival of the associated pulses. The method also includes implementing a third clustering algorithm for grouping together the second classes into third classes, based on optimal transport distances between the corresponding determined distributions of the times of arrival.

10 Claims, 8 Drawing Sheets

(56) References Cited

OTHER PUBLICATIONS

M. Mottier, G. Chardon and F. Pascal, "Deinterleaving and Clustering unknown RADAR pulses," 2021 IEEE Radar Conference (RadarConf21), Atlanta, GA, USA, 2021, pp. 1-6, doi: 10.1109/RadarConf2147009.2021.9455272. (Year: 2021).*
European Search Report and Written Opinion issued in EP23305059 on Jun. 19, 2023 (10 pages).
Mottier, et al., "Desentrelacement et classification des emetteurs RADARs bases sur l'utilisation des distances de Transport Optimal" published Dec. 2, 2022; Conference on Artificial Inteligence for Defense (10 pages), and English Translation thereof.
Mottier, et al., "Deinterleaving and Clustering unknown RADAR pulses", published Aug. 29, 2022; 2021 IEEE Radar Conference (6 pages).
Mottier, et al., "RADAR Emitter Classification with Optimal Transport Distances", published May 7, 2021, 2021 IEEE Radar Conference (5 pages).
Gasperini, et al., "Signal Clustering With Class-Independent Segmentation", published May 4, 2020, ICASSP 2020—2020 IEEE International Conference on Acoustics, Speech and Signal Processing (ICASSP), IEEE (5 pages).
Revillon, et al, "Radar emitters classification and clustering with a scale mixture of normal distributions", published Jan. 1, 2019, IET Radar Sonar Navigation, the Institution of Engineering and Technology (11 pages).

* cited by examiner

METHOD FOR DEINTERLEAVING RADAR PULSES

This application claims priority to European Patent Application Number 23305059.0, filed 17 Jan. 2023, the specification of which is hereby incorporated herein by reference.

BACKGROUND OF THE INVENTION

Field of the Invention

At least one embodiment of the invention relates to a method for deinterleaving radar pulses, each radar pulse being associated with a respective frequency, duration and time of arrival.

At least one embodiment of the invention also relates to a computer program and a device configured to implement such a method.

At least one embodiment of the invention applies to the field of signal processing, in particular to distinguishing between pulses from distinct radar transmitters.

Description of the Related Art

A radar transmitter is described by the characteristics of the pulses that it transmits: frequency, pulse duration, level, time of arrival, direction of arrival, etc. However, the evolution of technologies has led radar sources to have more complex and more similar electromagnetic spectra. For example, some radar transmitters may transmit on a single frequency, while others transmit over several frequencies.

This makes the deinterleaving (that is to say the discrimination) of radar pulses received by a receiver coming from a plurality of distinct radar transmitters more and more difficult, particularly in the presence of noise.

To overcome this problem, it has been proposed to resort to artificial intelligence models to perform such deinterleaving. In particular, it has been proposed to train artificial intelligence models based on labeled data, associated with respective radar transmitters.

Nevertheless, such a deinterleaving method is not entirely satisfactory.

Indeed, the data used for training such models are often truncated or partially observed, which is detrimental to the performance of the models. Such a situation leads to the use of simulated signals, which are not always representative of the signals that may actually be observed.

Furthermore, such a method requires, during the training phase, an extensive initial knowledge of the radar transmitters likely to be encountered, and requires retraining the models upon each addition of a new radar transmitter to the list of known transmitters.

One aim of at least one embodiment of the invention is to solve at least one of the drawbacks of the state of the art.

Another purpose of at least one embodiment of the invention is to propose a deinterleaving method that is effective and whose implementation does not require a priori knowledge of the radar transmitters from which the radar pulses are likely to originate.

BRIEF SUMMARY OF THE INVENTION

To this end, at least one embodiment of the invention relates to a deinterleaving method of the aforementioned type, the method being computer-implemented and comprising the steps of:

- implementing a first clustering algorithm to assign each pulse to a corresponding first class, based on the associated frequency, duration and time of arrival;
- for each first class, estimating, based on the frequency and the duration of each corresponding pulse, a respective average frequency and a respective average pulse duration;
- implementing a second clustering algorithm to group the first classes into second classes based on the corresponding average frequency and average duration;
- for each second class, determining a distribution of the times of arrival of the associated pulses;
- implementing a third clustering algorithm to group the second classes into third classes, based on optimal transport distances between the corresponding determined distributions of the times of arrival, each third class being associated with a respective radar transmitter.

Indeed, taking into account the frequency, duration, and time of arrival of the pulses, during the implementation of the clustering algorithm, allows for excellent discrimination of the signals coming from radar transmitters which have close characteristics (in particular, which transmit on neighboring frequencies and/or with comparable pulse durations), particularly in the presence of noise.

By implementing such clustering, an adverse effect whereby pulses having values close to the characteristics usually used for deinterleaving (frequency and/or pulse duration) are assigned to the wrong radar transmitter is avoided.

By virtue of such clustering, the impact of noise is negligible on the performance of the second and third clustering algorithms implemented subsequently, which provide reliable results.

Furthermore, the implementation of a hierarchical agglomerative algorithm based on the optimal transport distances ensures that pulses arriving at the same time at the receiver are assigned to the same radar transmitter, thus taking into account a possible multi-frequency character of one or more radar transmitters.

Advantageously, the method according to one or more embodiments of the invention has one or more of the following features, taken in isolation or according to any technically possible combination:

- the third clustering algorithm is implemented only for the pulses associated with a second class having a size greater than a predetermined minimum size;
- the method further comprises, after implementing the third clustering algorithm:
- for each third class, estimating a probability density function of a probability distribution of the time of arrival of the corresponding pulses;
- for each second class having a size less than the predetermined minimum size, called a non-significant class:
  - calculating a likelihood of each probability distribution, for the times of arrival of the corresponding pulses, from the estimated probability density function;
  - associating the non-significant class with the third class corresponding to the probability distribution for which the calculated likelihood is highest;
- for each third class, the estimating of the probability density function comprises the implementation of a parametric method, preferably a kernel method;
- the first clustering algorithm is a density-based unsupervised clustering algorithm, preferably a hierarchical density-based spatial clustering of applications with noise;

the second clustering algorithm implements a Kolmogorov-Smirnov test, based on the frequency or pulse duration, to decide whether the grouping of distinct first classes into a same second class is to be performed or not;

the third clustering algorithm implements a test, based on optimal transport distances between distributions of the times of arrival of the pulses of the second classes, to decide whether grouping second distinct classes into a same third class is to be performed or not;

the second clustering algorithm and/or the third clustering algorithm is a hierarchical agglomerative clustering algorithm.

According to at least one embodiment of the invention, a computer program is proposed comprising executable instructions, which, when they are executed by a device, implement the steps of the method as defined above.

The computer program may be in any computer language, such as, for example, in machine language, in C, C++, JAVA, Python, etc.

According to at least one embodiment of the invention, a device for deinterleaving radar pulses is proposed, each radar pulse being associated with a respective frequency, duration and time of arrival, the deinterleaving device comprising a processing unit configured to:

implement a first clustering algorithm to assign each pulse to a corresponding first class, based on the associated frequency, duration and time of arrival;

for each first class, estimate, based on the frequency and the duration of each corresponding pulse, a respective average frequency and a respective average pulse duration;

implement a second clustering algorithm to group the first classes into second classes based on the corresponding average frequency and average duration;

for each second class, determine a distribution of the times of arrival of the associated pulses;

implement a third clustering algorithm to group the second classes into third classes, based on optimal transport distances between the corresponding determined distributions of the times of arrival, each third class being associated with a respective radar transmitter.

The device according to one or more embodiments of the invention may be any type of apparatus such as a server, a computer, a tablet, a calculator, a processor, a computer chip, programmed to implement the method according to the invention, for example by running the computer program as defined above.

BRIEF DESCRIPTION OF THE DRAWINGS

One or more embodiments of the invention will be better understood on reading the following description, given solely by way of non-limiting example and with reference to the accompanying drawings, wherein.

DETAILED DESCRIPTION OF THE INVENTION

It is clearly understood that the one or more embodiments that will be described hereafter are by no means limiting. In particular, it is possible to imagine variants of the one or more embodiments of the invention that comprise only a selection of the features disclosed hereinafter in isolation from the other features disclosed, if this selection of features is sufficient to confer a technical benefit or to differentiate the one or more embodiments of the invention with respect to the prior art. This selection comprises at least one preferably functional feature which is free of structural details, or only has a portion of the structural details if this portion alone is sufficient to confer a technical benefit or to differentiate the invention with respect to the prior art.

In particular, all of the described variants and embodiments may be combined with each other if there is no technical obstacle to this combination.

In the Figures and in the remainder of the description, the same reference has been used for the features that are common to several figures.

Figure 1:
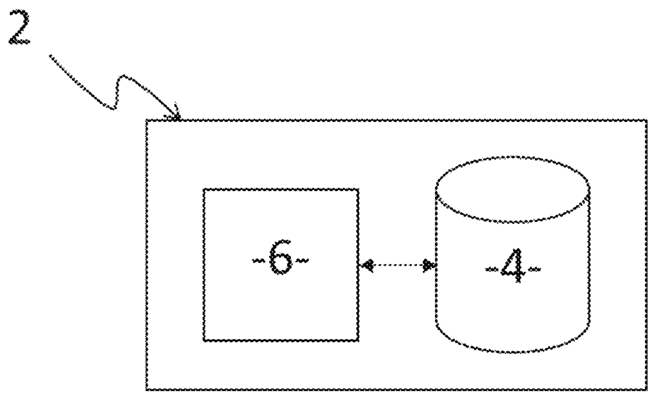
FIG. 1 is a schematic representation of a deinterleaving device according to one or more embodiments of the invention.

A deinterleaving device 2 according to one or more embodiments of the invention is shown by FIG. 1.

The deinterleaving device 2 is intended to deinterleave radar pulses received by a receiver, more specifically in the case where said pulses come from a plurality of distinct radar transmitters.

The deinterleaving device 2 comprises a memory 4 and a processing unit 6 connected to each other.

The deinterleaving device 2 may be in hardware form, such as a computer, a server, a processor, an electronic chip, etc. Alternatively or additionally, the deinterleaving device 2 may be in software form, such as a computer program or an application, for example an application for a user apparatus like a tablet or smart phone.

The memory 4 is configured to store, for each received pulse, a respective frequency, duration, and time of arrival. Preferably, in at least one embodiment, each pulse is associated, in the memory 4, with a respective identifier.

Furthermore, as will become apparent in the following description, the memory 4 is also configured to store other information, such as an identifier of a first class, a second class, and/or a third class with which each pulse is associated.

For each pulse, the respective frequency, duration, and time of arrival have, for example, previously been obtained by means of a pre-processing stage configured to determine said characteristics for each pulse received at the receiver.

The processing unit 6 is a hardware processing unit, such as a processor, an electronic chip, a calculator, a computer, a server, etc. Alternatively or additionally, in at least one embodiment, the processing unit 6 is a software processing unit, such as an application, a computer program, a virtual machine, etc.

Figure 2:
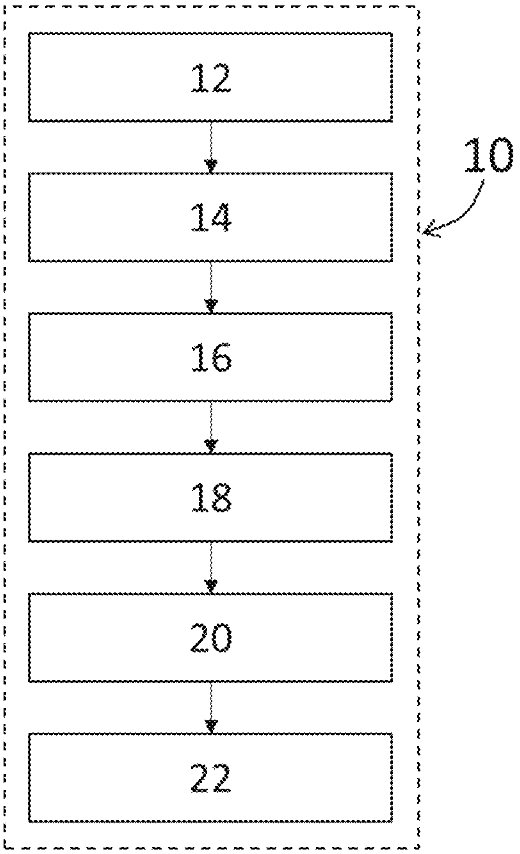
FIG. 2 is a flowchart of a deinterleaving method according to one or more embodiments of the invention, implemented by the device of FIG. 1.

The processing unit 6 is configured to implement a deinterleaving method 10 (FIG. 2), in order to assign each pulse to a corresponding radar transmitter.

The implementation of the deinterleaving method according to one or more embodiments of the invention will be described with reference to the example of FIGS. 3, 4 and 5, wherein the pulses are received from three distinct radar transmitters.

The first radar transmitter is configured to transmit pulses having a duration of 11 ns (nanosecond), at four distinct frequencies: 965 MHz, 1010 MHz, 1060 MHz and 1110 MHz (megahertz). In FIGS. 3 to 5, the corresponding pulses are each represented by a square marker.

The second radar transmitter is configured to transmit pulses having a duration of 10.5 ns, at two distinct frequencies: 1000 MHz and 1055 MHz. In FIGS. 3 to 5, the corresponding pulses are each represented by a star-shaped marker.

Furthermore, in at least one embodiment, the third radar transmitter is configured to transmit pulses having a duration of 5 ns, at a single frequency of 800 MHz. In FIGS. 3 to 5, in at least one embodiment, the corresponding pulses are each represented by a circular marker.

Figure 3:
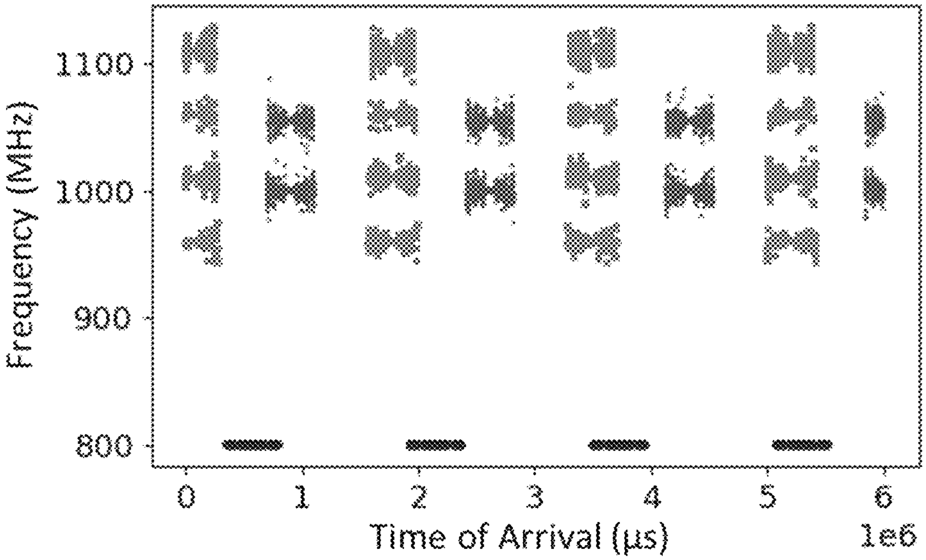
FIG. 3 is a graph representing pulses coming from three radar transmitters, as a function of their frequency and of their instant (or time) of arrival; according to one or more embodiments of the invention.

In FIG. 3, in at least one embodiment, the pulses are represented as a function of their frequency and of their time of arrival. In FIG. 3, it appears that the pulses coming from the first and second radar transmitters are spread out around the corresponding theoretical transmission frequencies. This results from the presence of noise, which leads to errors in determining the frequency carried out by the pre-processing stage.

Conversely, in this example, the signal corresponding to the pulses coming from the third radar transmitter is not noisy, so that the same frequency is determined for all corresponding pulses.

Figure 4:
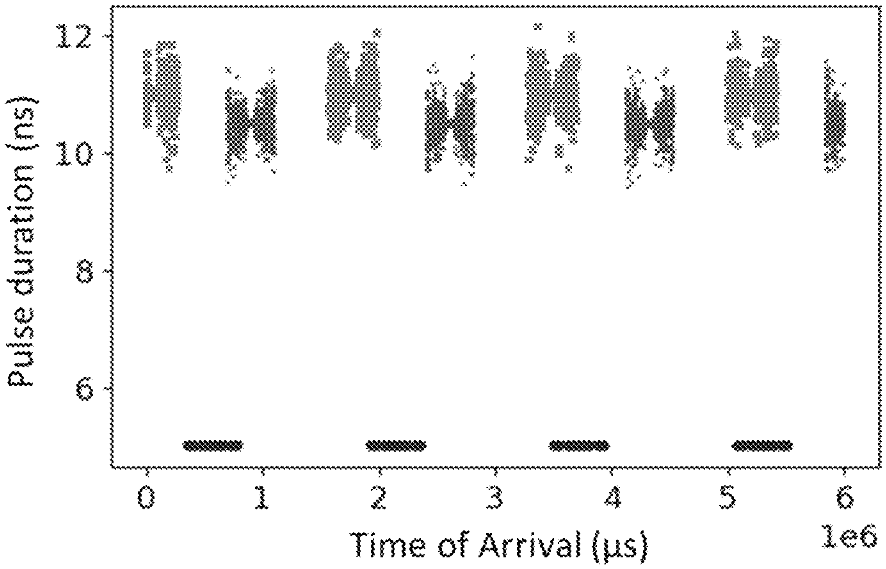
FIG. 4 is a graph representing the pulses of FIG. 3, as a function of their duration and of their time of arrival; according to one or more embodiments of the invention.

In FIG. 4, in at least one embodiment, the pulses are represented as a function of their duration and of their time of arrival. In FIG. 4, it appears that the pulses coming from the first and second radar transmitters are also spread out around the corresponding theoretical durations. This results from the noise mentioned above, which also leads to errors in the pulse duration determination carried out by the pre-processing stage.

Conversely, in this example, the absence of noise on the signal associated with the pulses coming from the third radar transmitter results in a same determined duration for all the corresponding pulses.

Figure 5:
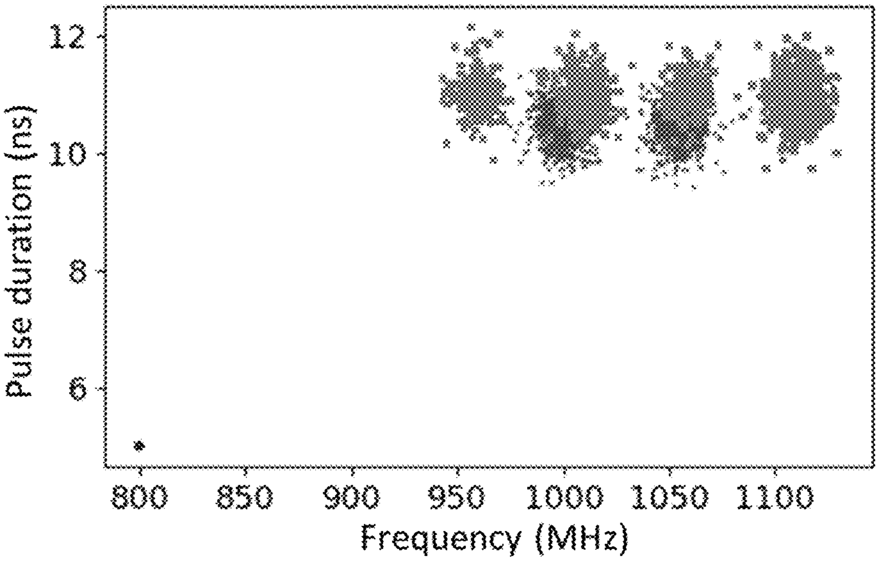
FIG. 5 is a graph representing the pulses of FIG. 3, as a function of their duration and of their frequency; according to one or more embodiments of the invention.

Finally, in FIG. 5, in at least one embodiment, the pulses are represented as a function of their duration and of their frequency. It results from the foregoing that, in this representation, and due to the presence of noise, the pulses coming from the first and second radar transmitters form clusters that are superimposed.

As indicated above, by way of one or more embodiments, the processing unit 6 is configured to implement the deinterleaving method 10, in order to assign each pulse to a corresponding radar transmitter, even in the case of the example of FIGS. 3 to 5.

To execute said deinterleaving method 10, the processing unit 6 is configured to perform the steps of:

implementing 12 a first clustering algorithm;
estimating 14 frequency and average duration;
implementing 16 a second clustering algorithm;
determining a distribution 18; and
implementing 20 a third clustering algorithm.

Preferably, the processing unit 6 is also configured to implement an optional step 22 of processing non-significant classes.

Implementing the First Clustering Algorithm

More precisely, the processing unit 6 is configured to implement, during step 12, a first clustering algorithm for assigning each pulse to a corresponding first class, based on the associated frequency, duration, and time of arrival.

This is advantageous, insofar as, by implementing three-dimensional clustering, the problem caused by the superimposition of the pulses in the plane of the durations and of the frequencies, due to the presence of noise, is overcome. As a result, each first class is associated with a pass of a radar transmitter, for a given theoretical frequency and duration of pulses.

Preferably, in at least one embodiment, the processing unit 6 is also configured to write, in the memory 4, in association with each pulse, the associated first class.

Advantageously, in at least one embodiment, the first clustering algorithm is a density-based unsupervised clustering algorithm. This is advantageous, insofar as such an algorithm makes it possible to process classes that are heterogeneous in terms of density and distribution of points.

For example, the first clustering algorithm is the HDBSCAN algorithm (for "Hierarchical Density-Based Spatial Clustering of Applications with Noise").

Alternatively, in at least one embodiment, the first clustering algorithm is the DBSCAN algorithm (for "Density-Based Spatial Clustering of Applications with Noise", or the OPTICS algorithm (for "Ordering Points to Identify The Clustering Structure").

In the case of the example described above, the implementation of step 12 leads to the identification of thirty-six distinct first classes, as well as to a set of pulses considered to form outlier data.

Figure 6:
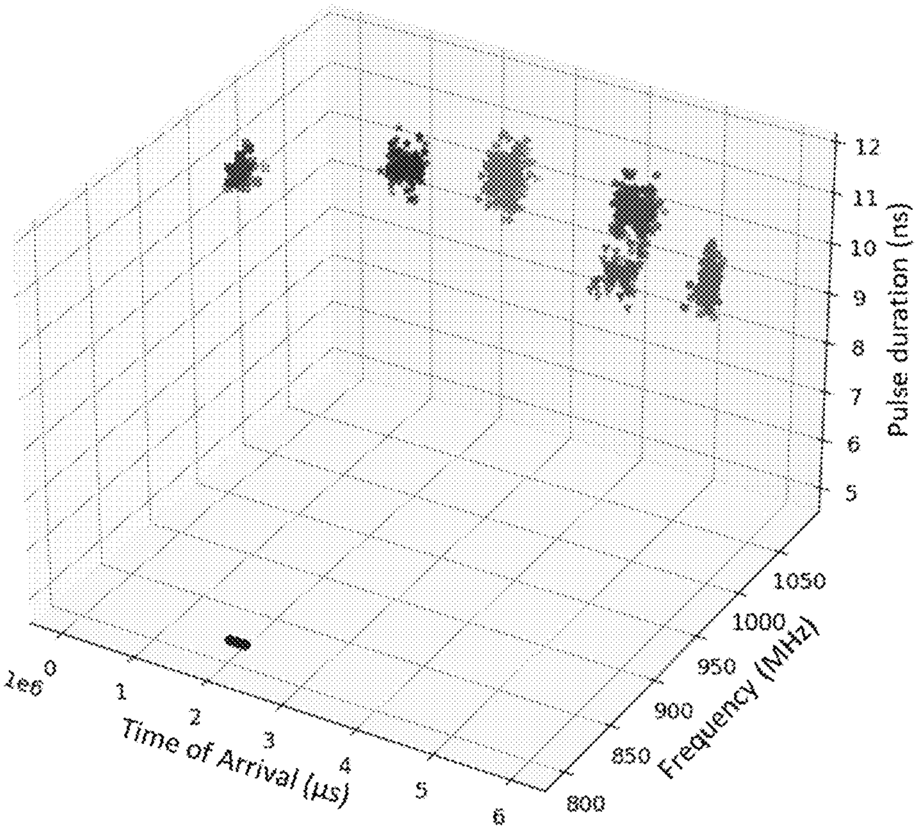
FIG. 6 is a graph representing part of the pulses of FIG. 3, as a function of their frequency, of their time of arrival, of their duration and of their first class; according to one or more embodiments of the invention.

The results of the implementation of the first clustering algorithm on the pulses of the example are illustrated by FIG. 6. For the sake of readability, only seven first classes are represented, in the three-dimensional space of the frequencies, times of arrival and pulse durations.

The pulses of the same first class are represented by the same respective marker (dark circle, star, square, pentagon, downward-pointing triangle, light circle, right-pointing triangle).

Estimating the Average Frequency and Average Duration

The processing unit 6 is also configured to estimate, during the estimation step 14, for each first class, a respective average frequency and a respective average pulse duration, based on the frequency and duration of the corresponding pulses.

For example, for each first class, the associated average frequency is equal to the arithmetic mean of the frequencies of all the corresponding pulses. Similarly, for each first class, the associated average pulse duration is, for example, equal to the arithmetic mean of the durations of all the corresponding pulses.

Figure 7:
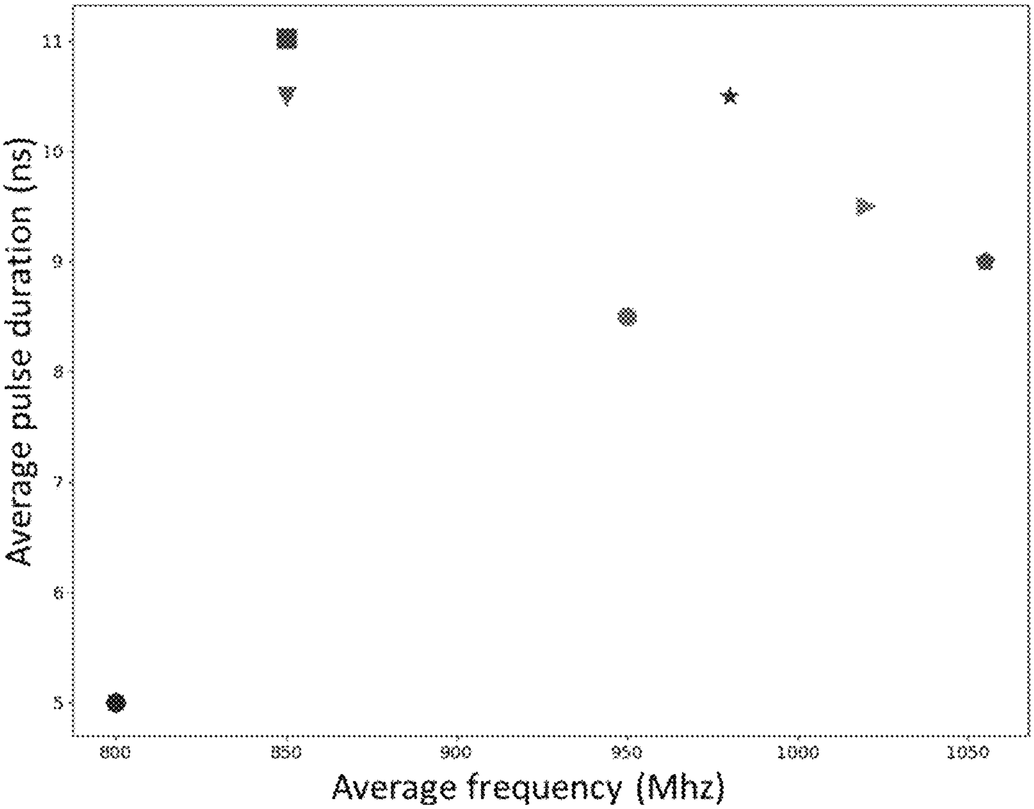
FIG. 7 is a graph representing the first classes of FIG. 6 as a function of their average pulse duration and their average frequency; according to one or more embodiments of the invention.

The results of the implementation of step 14, for the first classes of FIG. 6, are illustrated by FIG. 7, according to one or more embodiments of the invention. As appears in FIG. 7, each first class, associated with a respective marker, is associated with an average frequency (on the X-axis) and a corresponding average pulse duration (on the Y-axis).

Implementing the Second Clustering Algorithm

The processing unit 6 is also configured to implement, during step 16, a second clustering algorithm to group the first classes into second classes, based on the corresponding average frequency and average pulse duration, which were determined during the step of estimating 14.

In this case, all the pulses of a given first class are associated with a same second class.

Preferably, in at least one embodiment, the processing unit 6 is also configured to write, in the memory 4, in association with each pulse, the associated second class.

Advantageously, in at least one embodiment, the second clustering algorithm is a hierarchical agglomerative algorithm. Such a clustering algorithm has the advantage of being robust.

In at least one embodiment, the processing unit 6 is configured to iteratively aggregate the first classes, based on their distance in the space of average frequencies and average pulse durations. For example, such a distance is the Euclidean distance.

More precisely, in at least one embodiment, the processing unit 6 is configured to, at each iteration, calculate the distances between all the first elements taken in pairs, and to aggregate the two first elements for which the calculated distance is smallest.

In this step, "first element" means a first class, or even an aggregate of first classes obtained at the end of a preceding iteration.

Furthermore, the processing unit 6 is configured to calculate a score associated with each aggregation. As will be described later, the processing unit 6 is also configured to group the first classes into second classes or not based on the calculated scores.

Preferably, in one or more embodiments, to calculate each score, the processing unit 6 is configured to implement a statistical test based on a characteristic of the pulses. Preferably, said characteristic is the frequency of the pulses of each first element. Alternatively, in at least one embodiment, if the variance of the pulse durations is less than a predetermined value (situation representative of a low-noise radar signal), the processing unit 6 is configured to implement the statistical test based on the frequency and duration of the pulses of each first element. In each of these two cases, the score is preferably the p-value provided by the statistical test.

Advantageously, in at least one embodiment, the statistical test is the Kolmogorov-Smirnov test. This is advantageous, insofar as such a test makes it possible to determine whether two first elements have been generated by the same probability distribution, resulting in a reliable evaluation of their similarity.

Figure 8:
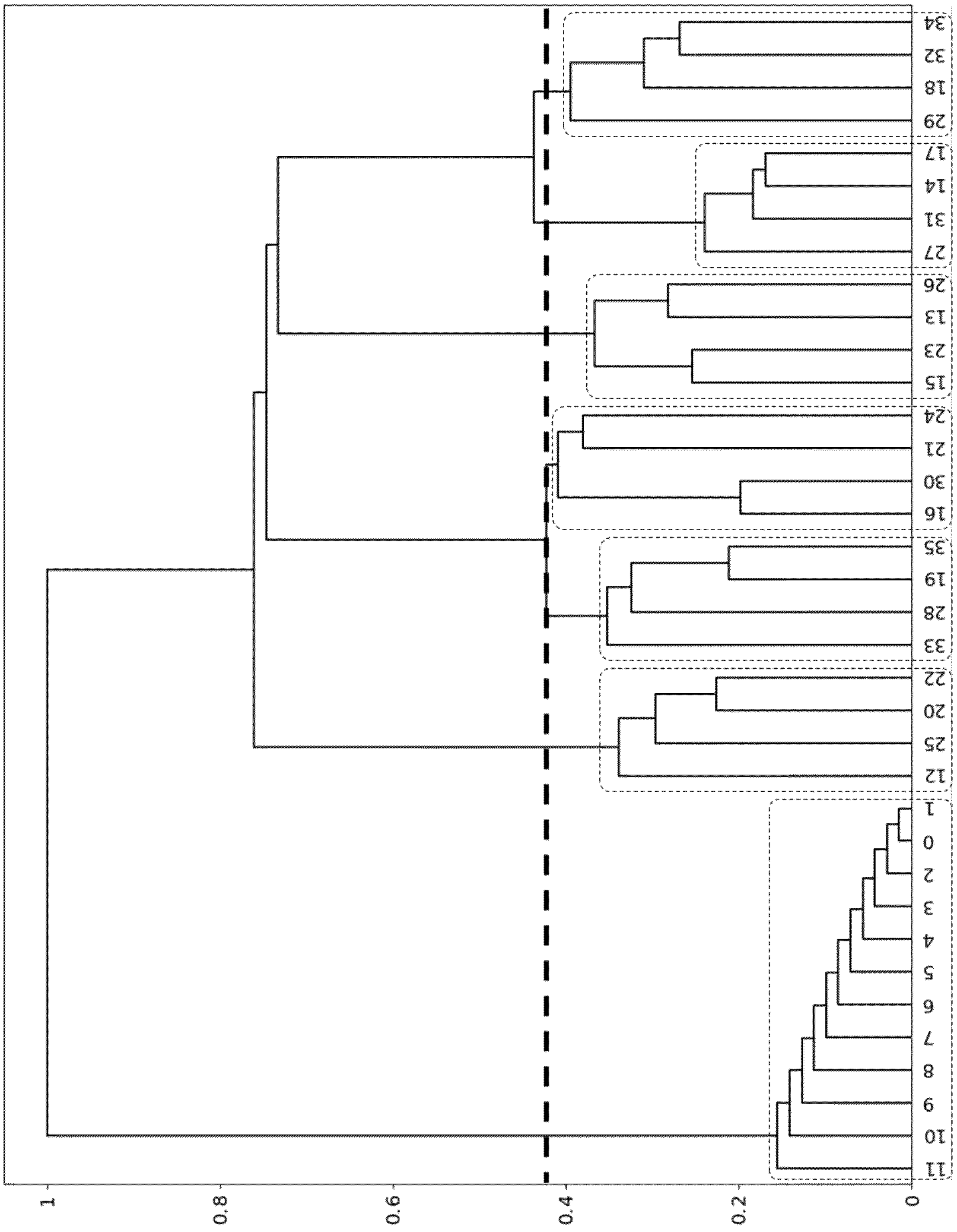
FIG. 8 is a dendrogram representative of the implementation of a second clustering algorithm for clustering the first classes of the pulses of FIG. 3; according to one or more embodiments of the invention.

The processing unit 6 is also configured to enrich a dendrogram representative of the implementation of the hierarchical agglomerative algorithm. More precisely, the processing unit 6 is configured to assign, to each node of the dendrogram, representative of the aggregation of two first elements, the result of the statistical test for these two first elements. For example, in FIG. 8, the dendrogram obtained at the end of such an aggregation is shown for the thirty-six first classes obtained at the end of step 12.

The processing unit 6 is also configured to group said two first elements into the same second class if the score is less than a first predetermined threshold. For example, in FIG. 8, the first predetermined threshold is shown by a broken line of ordinate 0.42.

The processing unit 6 is also configured to consider the next branch, if the score is less than the first predetermined threshold, or if the top of the dendrogram is reached.

Preferably, in at least one embodiment, the first threshold is a function of the values taken by the score for the set of first elements. For example, each value of the statistical test is associated with a ratio obtained by dividing said value by the value of the statistical test immediately below. Then, the first threshold is chosen to be strictly between the value of the statistical test associated with the greatest ratio and the value of the statistical test immediately below.

Figure 9:
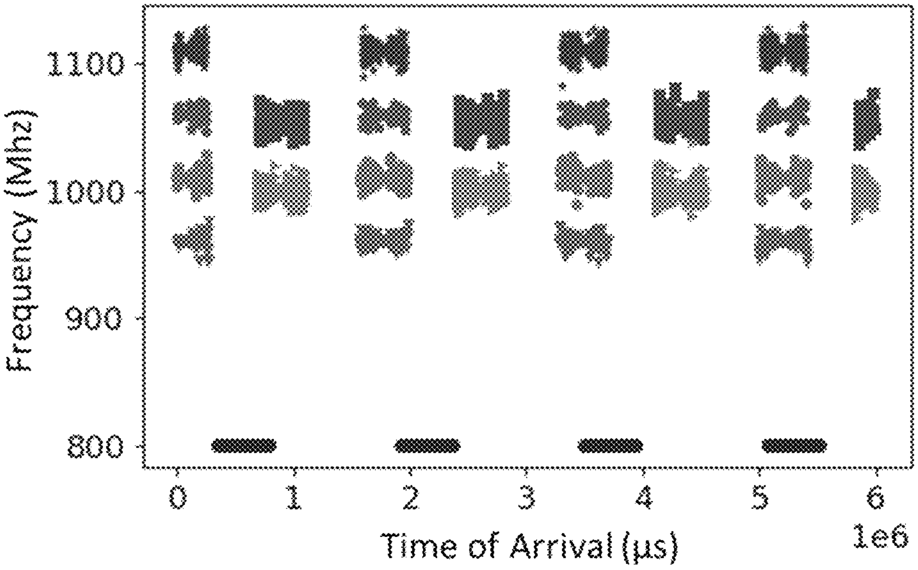
FIG. 9 is a graph representing the pulses of FIG. 3, as a function of their frequency, of their time of arrival, and of their second class; according to one or more embodiments of the invention.

The result of the application of the second clustering algorithm to the first classes of the example is illustrated by FIG. 9. As appears in FIG. 9, the thirty-six first classes were grouped into seven second classes, each associated with a respective marker.

Determination of Distribution

The processing unit 6 is also configured to determine, during the determination step 18, a distribution of the times of arrival for each second class. In other words, for each second class, the processing unit 6 is configured to determine a histogram of the times of arrival of the associated pulses.

Implementing the Third Clustering Algorithm

The processing unit 6 is also configured to implement, during step 20, a third clustering algorithm for grouping together the second classes into third classes, based on optimal transport distances between the distributions of the times of arrival determined during the determination step 18.

In this case, in at least one embodiment, all the pulses of a given second class are associated with a same third class.

In the context of one or more embodiments of the invention, each third class is considered as representing a respective radar transmitter.

Preferably, in at least one embodiment, the processing unit 6 is also configured to write, in the memory 4, in association with each pulse, the associated third class.

Preferably, in at least one embodiment, the third clustering algorithm is a hierarchical agglomerative algorithm.

In this case, the processing unit 6 is configured to iteratively aggregate the second classes, based on the optimal transport distance between the distributions of the corresponding times of arrival, simply called "optimal transport distance" hereinafter.

More specifically, in at least one embodiment, the processing unit 6 is configured to, at each iteration, calculate the optimal transport distances between all the second elements taken in pairs, and to aggregate the two second elements for which the calculated optimal transport distance is smallest.

In the context of one or more embodiments of the invention, "optimal transport distance" is understood to mean a value representative of the cost to transform one distribution into another, that is to say to move the points from one distribution to another.

In this step, "second element" means a second class, or even an aggregate of second classes obtained at the end of a preceding iteration.

Figure 10A:
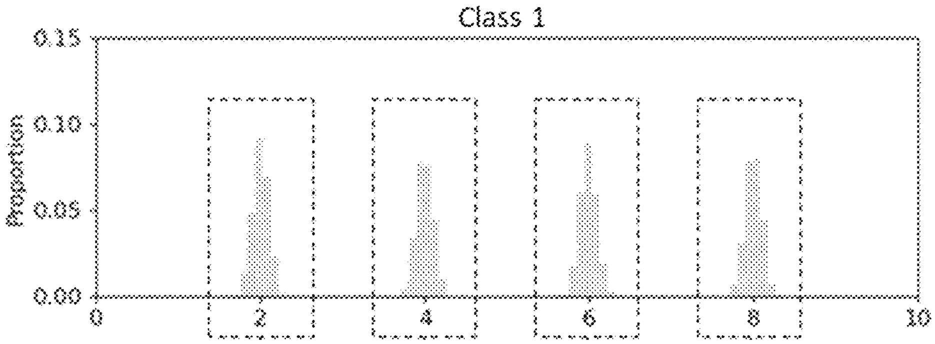
FIGS. 10A, 10B and 10C are histograms of the times of arrival of the pulses of, respectively, three second distinct classes of the pulses of FIG. 9; according to one or more embodiments of the invention.
Figure 10B:
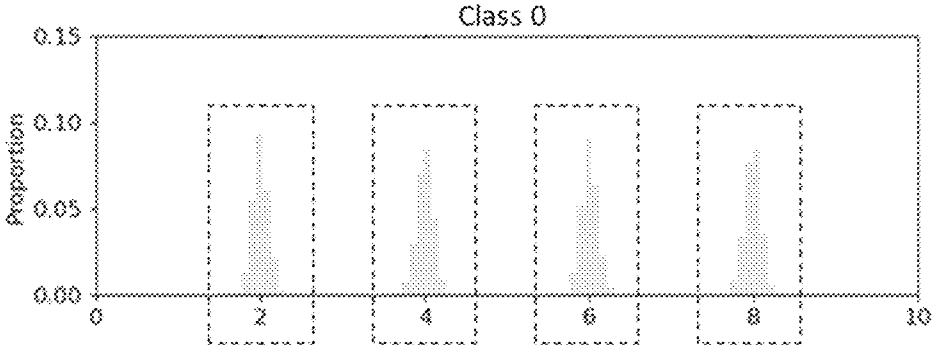
Figure 10C:
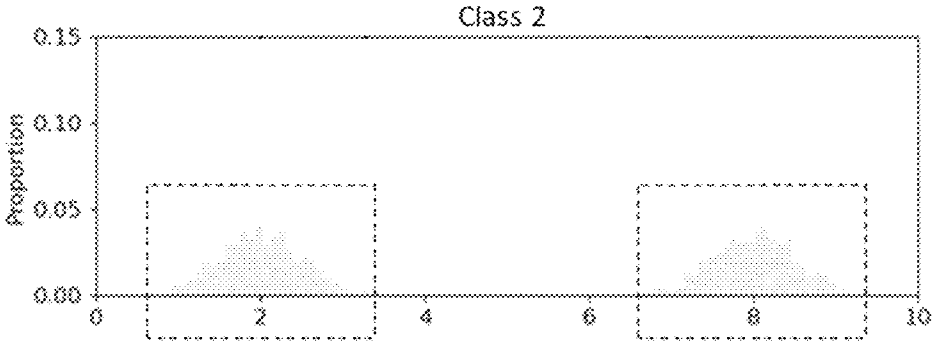

For example, it appears that the distributions of FIGS. 10A and 10B are very similar. In particular, the pulses of the second class associated with FIG. 10A and the pulses of the second class associated with FIG. 10B arrive at the same time at the receiver, which reflects that the pulses of these two second classes probably come from the same radar transmitter. The optimal transport distance between the two second classes is therefore low. Conversely, in at least one embodiment, it appears that the distributions of FIGS. 10B and 10C are not very similar, and the cost to transform one distribution into the other is higher than previously. Therefore, the processing unit 6 firstly aggregates the second classes associated with FIGS. 10A and 10B.

The processing unit 6 is also configured to enrich a dendrogram representative of the implementation of the hierarchical agglomerative algorithm.

The processing unit 6 is further configured to group together, in a same third class, the second elements for which the optimal transport distance is less than a second predetermined threshold. For example, each optimal transport distance is associated with a ratio obtained by dividing said optimal transport distance by the optimal transport distance immediately below. Then, the second threshold is chosen to be strictly between the optimal transport distance associated with the greatest ratio and the optimal transport distance immediately below.

Treatment of Non-Significant Classes

Advantageously, in at least one embodiment, the third clustering algorithm is implemented only for the pulses associated with a second class having a size greater than a predetermined minimum size.

In the context of one or more embodiments of the invention, "size of a class" refers to the number of pulses associated therewith.

This is advantageous, insofar as, to be significant, and therefore to ensure reliable grouping, the optimal transportation distance must be calculated over a sufficient number of pulses, in the order of one hundred pulses.

Each second class having a size less than the predetermined minimum size is called a "non-significant class".

In this case, the processing unit 6 is configured to estimate, during a step 22 subsequent to the implementation 20 of the third clustering algorithm, a probability density function of a probability distribution of the time of arrival of the pulses corresponding to each third class.

Furthermore, in at least one embodiment, the processing unit 6 is configured to, for each non-significant class:

- calculate a likelihood of each probability distribution, for the times of arrival of the pulses corresponding to said non-significant class, from the estimated probability density function; and
- associate the non-significant class with the third class corresponding to the probability distribution for which the calculated likelihood is highest.

Preferably, in one or more embodiments, to estimate the probability density function, the processing unit 6 is configured to implement a non-parametric method, for example a kernel method. This is advantageous, since a non-parametric method allows an estimation of the probability density function without a priori knowledge of all parameters describing the structure of the data.

Figure 11:
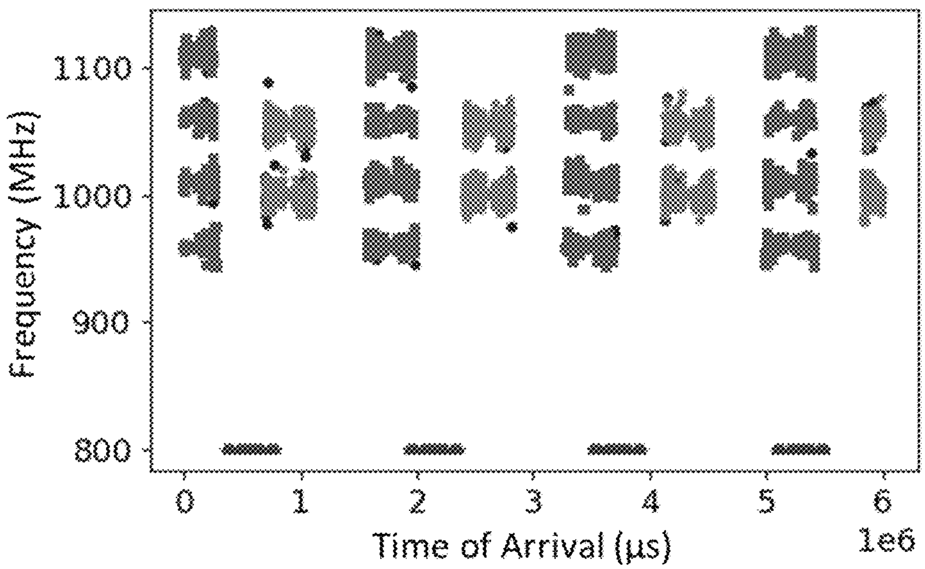
FIG. 11 is a graph representing the pulses of FIG. 3, as a function of their frequency, of their time of arrival, and of their third class; according to one or more embodiments of the invention.

The result of implementing steps 20 and 22 to the second classes of the example is illustrated by FIG. 11, according to one or more embodiments of the invention, on which it appears that each pulse (outside the outlier data coming from step 12) is associated with a respective third class, that is to a respective radar transmitter.

Implementing the third clustering algorithm only for the pulses associated with a second class of size greater than the minimum size is an advantageous feature, insofar as, to ensure reliable clustering, the optimal transportation distance must be calculated over a sufficient number of pulses, on the order of one hundred pulses.

The processing of the non-significant classes on the maximum likelihood basis is advantageous, insofar as such a processing makes it possible to assign said non-significant classes to a third class, although their size does not make it possible to resort to a purely statistical approach.

Using a parametric method for estimating the probability density function of each third class is advantageous, since a non-parametric method allows an estimation of the probability density function without a priori knowledge of all parameters describing the structure of the data.

Using a density-based unsupervised clustering algorithm as the first clustering algorithm is advantageous, since such an algorithm authorizes a processing of classes that are heterogeneous in terms of density and distribution of points.

Using the Kolmogorov-Smirnov test is advantageous, since such a test makes it possible to determine whether two first elements have been generated by the same probability distribution, resulting in a reliable evaluation of their similarity.

Using the optimal transport distances is advantageous, since this makes it possible to take into account a possible multi-frequency character of one or more radar transmitters.

Using a hierarchical agglomerative algorithm for the second clustering algorithm and/or the third clustering algorithm is advantageous, such a clustering algorithm being robust.

Of course, the one or more embodiments of the invention are not limited to the examples disclosed above.

Operation

Operation of the deinterleaving device 2 will now be described, according to one or more embodiments of the invention.

The deinterleaving device 2 receives radar pulses, each associated with a respective frequency, duration, and time of arrival.

Then, during a step 12, the processing unit 6 of the deinterleaving device 2 implements the first clustering algorithm to assign each pulse to a corresponding first class, based on the associated frequency, duration and time of arrival.

Preferably, for each pulse, the processing unit 6 writes, in the memory 4, the first corresponding class.

Then, during an estimation step 14, the processing unit 6 estimates, for each first class, an average frequency and a respective average pulse duration, from the frequency and duration of the corresponding pulses.

Then, during a step 16, the processing unit 6 implements a second clustering algorithm to group the first classes into second classes, based on the corresponding average frequency and average pulse duration, determined during the estimation step 14.

Preferably, for each pulse, the processing unit 6 writes, in the memory 4, the second corresponding class.

Then, during a determination step 18, the processing unit 6 determines, for each second class, a distribution of the times of arrival of the corresponding pulses.

Then, during a step 20, the processing unit 6 implements a third clustering algorithm to group the second classes into third classes, based on optimal transport distances between the distributions of the times of arrival determined during the determination step 18.

Advantageously, in at least one embodiment, the processing unit 6 implements the third clustering algorithm only for the second classes having a size greater than the predetermined minimum size.

In this case, after step 20, and for each third class, the processing unit 6 estimates, during step 22, a probability density function of a probability distribution of the time of arrival of the corresponding pulses.

Furthermore, in one or more embodiments, for each non-significant class, the processing unit 6 calculates a likelihood of each probability distribution, for the times of arrival of the pulses corresponding to said non-significant class, based on the estimated probability density function. Then the processing unit 6 associates each non-significant class with the third class associated with the probability distribution for which the calculated likelihood is highest.

The invention claimed is:

1. A method for deinterleaving radar pulses, each radar pulse of said radar pulses being associated with a frequency, a duration and a time of arrival, wherein the method is computer-implemented and wherein the method comprises:

implementing a first clustering algorithm to perform three-dimensional clustering of the radar pulses based on the frequency, the duration and the time of arrival associated therewith, to assign said each radar pulse to a corresponding first class, wherein each first class is associated with a pass of a respective radar transmitter for a given theoretical frequency and pulse duration;

for each first class that is assigned to said each radar pulse, estimating, based on the frequency and the duration of said each radar pulse, a respective average frequency and a respective average pulse duration;

implementing a second clustering algorithm to group all of the each first class of said each radar pulse into second classes based on the respective average frequency and the respective average pulse duration associated therewith;

for each second class of said second classes, determining a distribution of the time of arrival of the each radar pulse associated therewith;

implementing a third clustering algorithm to group the second classes into third classes, based on optimal transport distances between the distribution of the time of arrival of the each radar pulse that is determined, wherein each third class of said third classes is associated with the respective radar transmitter.

2. The method according to claim 1, wherein the third clustering algorithm is implemented only for the radar pulses associated with a second class of said second classes having a size greater than a predetermined minimum size.

3. The method according to claim 2, further comprising, after said implementing the third clustering algorithm, for said each third class, estimating a probability density function of a probability distribution of the time of arrival of the each radar pulse corresponding therewith;

for said each second class having a size less than the predetermined minimum size, comprising a non-significant class, calculating a likelihood of said probability distribution, for the time of arrival of the each radar pulse corresponding therewith, from the probability density function that is estimated;

associating the non-significant class with a third class of said third classes corresponding to the probability distribution for which the likelihood that is calculated is highest.

4. The method according to claim 3, wherein, for said each third class, estimating the probability density function comprises implementing a parametric method, comprising a kernel method.

5. The method according to claim 1, wherein the first clustering algorithm is a density-based unsupervised clustering algorithm, comprising a hierarchical density-based spatial clustering of applications with noise.

6. The method according to claim 1, wherein the second clustering algorithm implements a Kolmogorov-Smirnov test, based on the frequency or the duration, to determine whether grouping distinct first classes into a same second class is to be performed or not.

7. The method according to claim 1, wherein the third clustering algorithm implements a test, based on optimal transport distances between said distribution of the time of arrival of all of the radar pulses of the second classes, to determine whether grouping second distinct classes into a same third class is to be performed or not.

8. The method according to claim 1, wherein one or more of the second clustering algorithm and the third clustering algorithm is a hierarchical agglomerative clustering algorithm.

9. A non-transitory computer program comprising executable instructions which, when executed by a computer, implement a method for deinterleaving radar pulses, each radar pulse of said radar pulses being associated with a frequency, a duration and a time of arrival, wherein the method comprises:

implementing a first clustering algorithm to perform three-dimensional clustering of the radar pulses based on the frequency, the duration and the time of arrival associated therewith, to assign said each radar pulse to a corresponding first class, wherein each first class is associated with a pass of a respective radar transmitter for a given theoretical frequency and pulse duration;

for each first class that is assigned to said each radar pulse, estimating, based on the frequency and the duration of said each radar pulse, a respective average frequency and a respective average pulse duration;

implementing a second clustering algorithm to group all of the each first class of said each radar pulse into second classes based on the respective average frequency and the respective average pulse duration associated therewith;

for each second class of said second classes, determining a distribution of the time of arrival of the each radar pulse associated therewith;

implementing a third clustering algorithm to group the second classes into third classes, based on optimal transport distances between the distribution of the time of arrival of the each radar pulse that is determined, wherein each third class of said third classes is associated with the respective radar transmitter.

10. A device that deinterleaves radar pulses, each radar pulse of said radar pulses being associated with a frequency, a duration and a time of arrival, the device comprising:

a processor, wherein said processor is configured to implement a first clustering algorithm to perform three-dimensional clustering of the radar pulses to based on the frequency, the duration and the time of arrival of said each radar pulse, to assign said each radar pulse to a corresponding first class, wherein each first class is associated with a pass of a respective radar transmitter for a given theoretical frequency and pulse duration;

for each first class of said radar pulses, estimate, based on the frequency and the duration of said each radar pulse, a respective average frequency and a respective average pulse duration;

implement a second clustering algorithm to group all of the each first class of said radar pulses into second classes based on the respective average frequency and the respective average pulse duration;

for each second class of said second classes, determine a distribution of the time of arrival of the radar pulses associated therewith;

implement a third clustering algorithm to group the second classes into third classes, based on optimal transport distances between the distribution of the time of arrival of said radar pulses associated therewith, each third class of said third classes being associated with the respective radar transmitter.

* * * * *